United States Patent Office 3,334,354
Patented Aug. 1, 1967

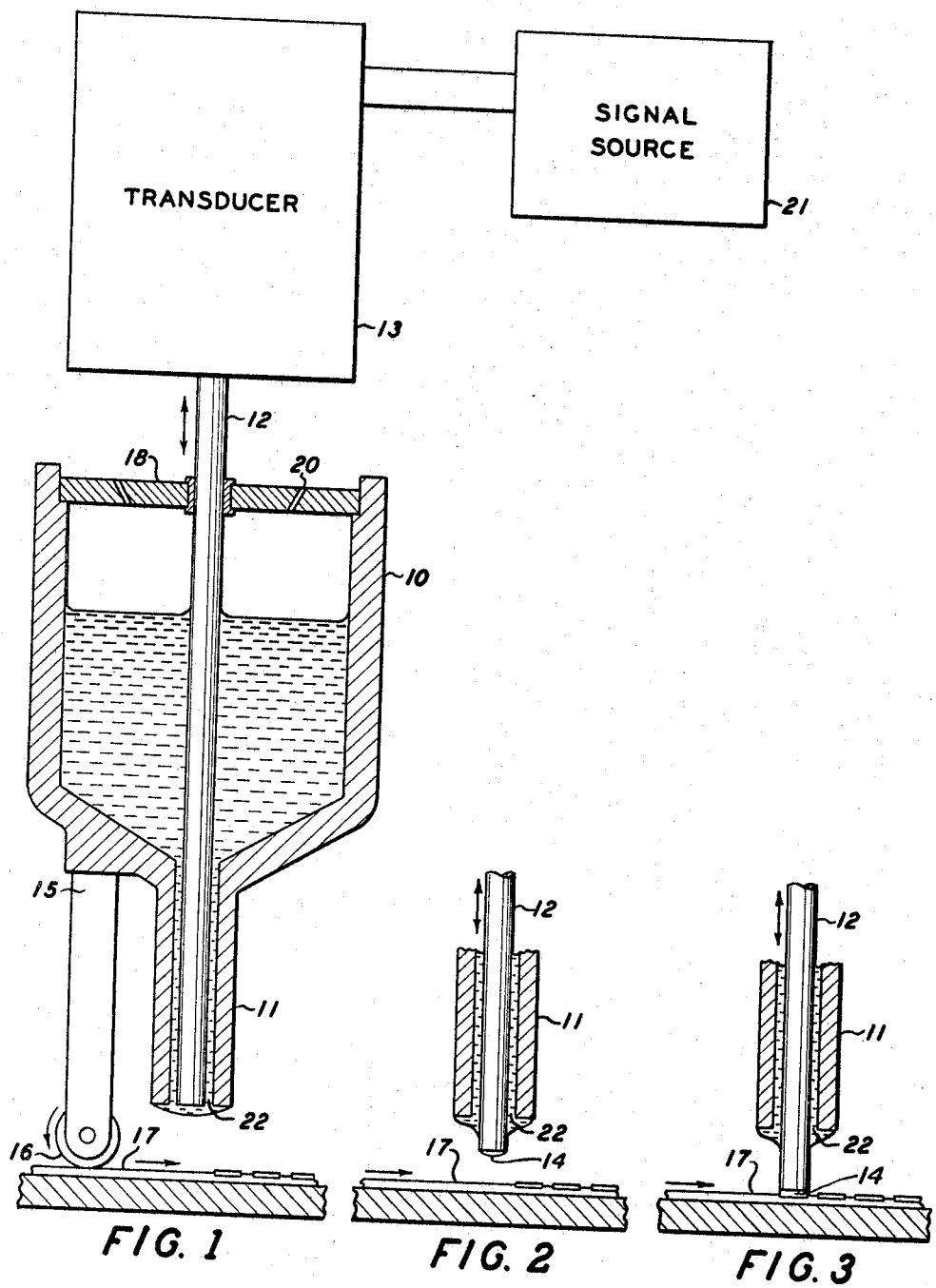

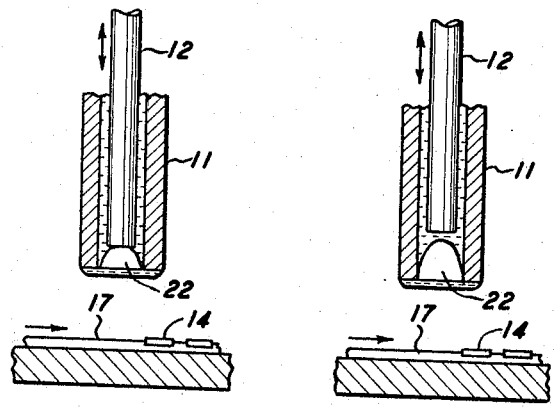
FIG. 4    FIG. 5
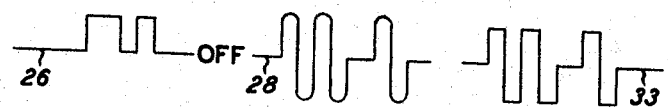
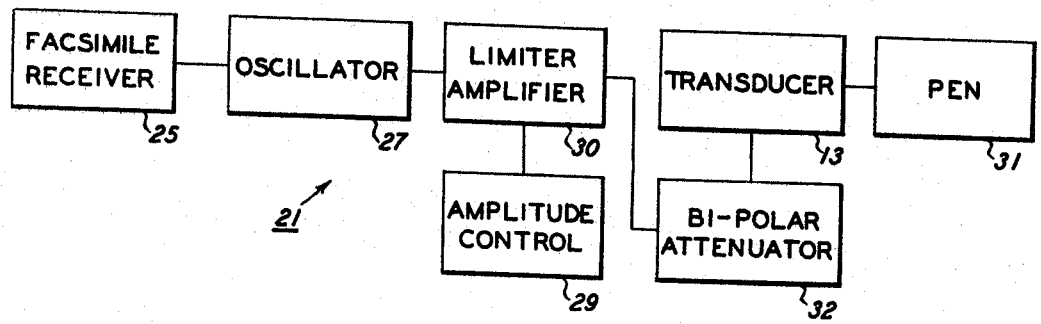
FIG. 6

3,334,354
DOTTING INK RECORDER
Edward C. Mutschler, Pittsford, N.Y., assignor to Xerox Corporation, Rochester, N.Y., a corporation of New York
Filed Mar. 17, 1966, Ser. No. 542,988
6 Claims. (Cl. 346—140)

ABSTRACT OF THE DISCLOSURE

A liquid ink recording system wherein a pin reciprocates about the orifice of a capillary tube to deposit a portion of an ink meniscus formed at the orifice on the surface of a recording medium without the pin contacting the surface. After the deposition of the ink the pin retracts into the capillary tube to an extent such that the pin is completely on the side of the orifice non-adjacent the recording surface. The system further includes a transducer operably connected to an electric circuit for controlling the amount of retraction of the pin into the capillary tube after recording. This circuit also includes an attenuator for controlling the excursion of the pin toward the recording surface.

---

This application is a continuation-in-part of application Ser. No. 320,762 filed Nov. 1, 1963, now abandoned.

This invention relates to recording and in particular to a device for the recording of electrical signals.

Of the many known means for producing a visible recording, the simplest is that in which a marking implement produces a direct visible image on the recording material. However, in recording from an electrical signal, it has been difficult to get rapid, on-off operation with such a marking implement. In various arrangements using liquid ink, the ink has tended to splatter, drag, skip, or otherwise produce an unacceptable image. As a result, recording devices using liquid ink have been limited almost entirely to recording oscillographs, seismographs, and other devices in which the ink line is continuous and supplies recorded information only by movement of a line back and forth with relation to some reference axis. In facsimile recording, for example, acceptable commercial arrangements have mostly appeared either using special materials that are sensitive to electric current or discharge of an electric spark, or using photosensitive materials with the signal displayed on a cathode ray tube or the like. All of these presently accepted commercial systems use special paper and the systems using electrical current or electrical spark discharge have been noted for slow speed and poor resolution.

Now, in accordance with the present invention, a pen for dispensing liquid ink has been discovered that is operative in response to electrical signals without the handicaps prominent in prior art pens. The pen of the present invention operates by carrying precise, uniform droplets of ink to a recording surface without contact between such surface and the mechanical parts of the pen. This end is achieved by reciprocating a pin substantially coaxially of an ink filled capillary tube, so that the tip or head of the pin breaks the meniscus of ink at the orifice of the tube and carries a precise and uniform droplet of ink to the recording surface without contact between the pin itself and the recording surface. Thus, it is an object of the present invention to define a novel liquid ink recording pen operable in response to electrical signals.

It is a further object of the present invention to define an information recording system in which a recording pen in accordance herewith is operable.

Further objects and features of the invention will become apparent by reading the following description in connection with the drawings wherein:

FIGURES 1, 2, 3, 4, and 5 diagrammatically illustrate the operative parts of the recording pen and demonstrate flow steps in the operation of the pen.

FIGURE 6 is a block diagram of a facsimile receiver system using the pen.

Figure 7:
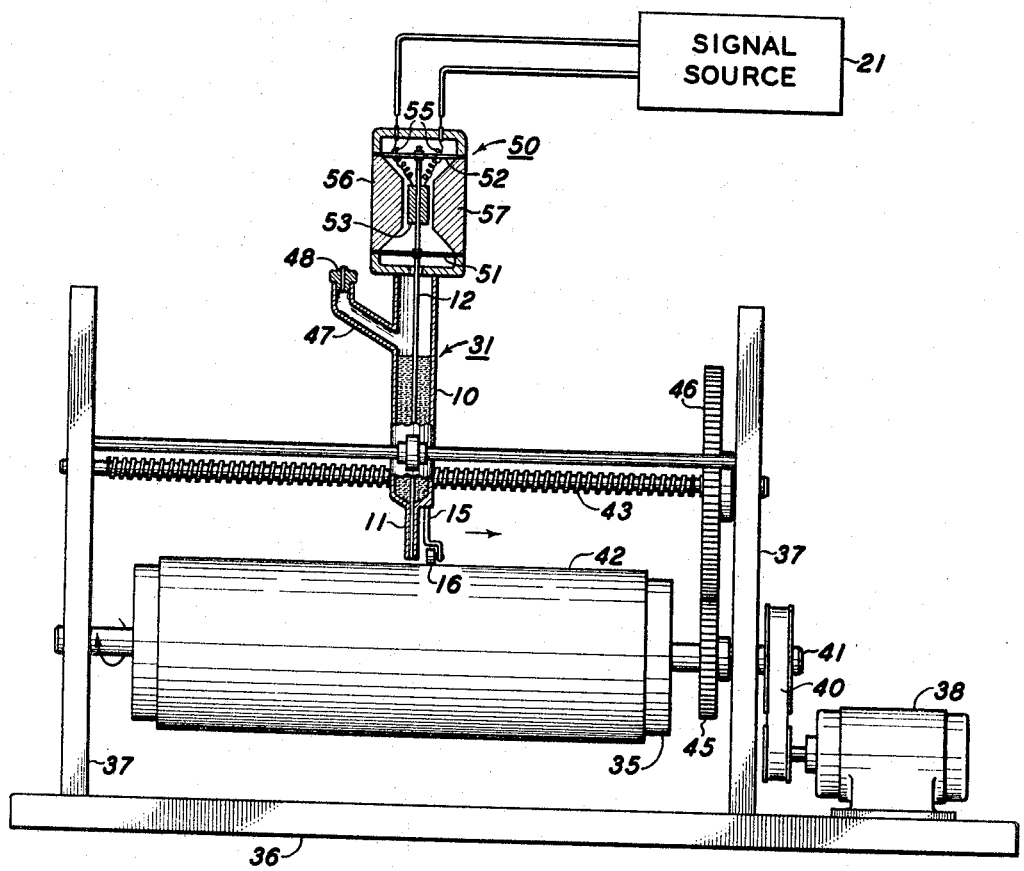
FIGURE 7, is an embodiment of the mechanical apparatus in a facsimile receiver using the pin of the present invention.

Referring now to FIGURE 1, it will be seen that the pen in accordance with the present invention employs an ink reservoir 10 contiguous with a capillary tube 11 so that the reservoir opens directly into the capillary tube bore. Pin 12 is positioned substantially through said reservoir and the capillary bore and is operated in reciprocating manner through capillary tube 11 by means of an electromechanical transducer 13. Support member 15 terminating in foot 16, such as a roller or sliding foot device, supports the body of the pin at a predetermined distance from the surface of a recording sheet 17 such as paper. The top of ink reservoir 10 is closed with a cover 18 to prevent ink from splashing out of the rseervoir. This cover must be sufficiently porous to pass air or else have vent holes 20 to prevent vacuum inside the ink reservoir from retarding the delivery of ink to the capillary tube. Electromechanical transducer 13 is energized by an electrical signal source 21 such as will be described more fully hereinafter. When reciprocated the action of pin 12 aids the capillary action in tube 11 to effect ink flow from the ink reservoir to the orifice 22 of the capillary tube 11 whereat the ink forms a meniscus closing over the orifice. Upon downward movement of pin 12 from a position behind the meniscus, the meniscus is punctured and a portion 14 thereof is carried on the tip, or head, of the pin toward the recording surface 17 until the ink, but not the pin tip itself, touches the recording surface. The pin then recedes from the recording surface leaving the conveyed ink thereon and returns to a position permitting a new meniscus of ink to form at orifice 22.

As the pin 12 reciprocates in a cycle from a start position and return it will travel through a path referred to hereinafter as the "stroke." The stroke begins on receipt of an actuating signal at the input terminals of the transducer 13 from signal source 21 with the pin tip positioned behind the meniscus at about the terminal plane of the orifice 22. The effect of the actuating signal, as will be described in more detail hereinafter, is such as to cause the transducer 13 to move the pin tip in a direction toward the recording surface until the tip reaches a point adjacent this recording surface. The position is referred to as the "record peak" of the stroke. The travel of the pin tip then reverses direction and recedes through the plane of the orifice 22 to a position, referred to as the "bore peak," in the bore of the capillary tube 11. This latter position generally may be distance from the orifice plane about equal to the record peak. The distance between the record and bore peaks is referred to as the "peak-to-peak" stroke distance. The stroke is completed when the pin tip returns from the bore peak to the beginning position at which the stroke or stroke cycle can be repeated upon receipt of the next actuating signal by the transducer 13.

The reciprocating action of the pin hereinabove described can be seen in more detail with reference also to FIGS. 2 to 5.

As noted above, at the beginning of the stroke the tip of the pin 12 is situated at about the terminal plane of the orifice 22 of capillary tube 11 (FIGURE 1) across which the ink meniscus has been formed. As the stroke begins, the ink meniscus is stretched and punctured by movement of the pin toward the recording surface 17 and a portion 14 of the meniscus is carried on the tip during its continued excursion (FIGURE 2). It is believed that as this portion 14 of the meniscus is carried away it breaks the surface tension and other cohesive forces that tend to resist the separation of any of the ink from the meniscus. Due to this puncturing of the meniscus only a small and controlled portion 14 of ink generally corresponding to the tip area of the pin is delivered to the recording surface. This is accomplished as the pin and the ink thereon continue toward the recording surface from the orifice plane until the ink, being forward of the tip, contacts the recording medium. At this point, the capillary action of the recording paper, for example, or the wettability of the recording surface, transfers the conveyed ink from the pin to the recording surface (FIGURE 3).

Since with each stroke the delivered droplet 14 of ink has previously been broken away by the pin from the main body of the meniscus, there is very little variation in the amount of ink delivered from one spot to the other. This ensures that the size of the ink dots successively deposited on the recording surface is extremely uniform. It should be noted that, by virtue of the controlled pin excursion as well as the spacing effected by support member 15 and foot 16, only the carried portion 14 of the ink meniscus and not the pin tip touches the recording surface. The pin is then removed from adjacent the recording surface and travels through the orifice plane to a position retreated into the capillary tube (FIGURE 4).

As the pin approaches toward the bore peak position of the stroke, the ink meniscus reforms between the retreating pin tip and the orifice 22 (FIGURE 5). It is believed that the retreating pin tip draws the reformed meniscus slightly inward of the capillary tube 11 as shown in exaggeration for clarity in FIGURE 5. The surface tension of the meniscus then causes the position of the meniscus to stabilize in the tube 11. As the pin tip continues toward its bore peak, the momentary pressure void created between the retreating pin tip and the meniscus is believed to be filled by ink flow from the reservoir due to the capillary action in the tube 11.

When the pin tip reaches the bore peak of the stroke, it directionally reverses its travel and moves toward the meniscus urging it and the ink filling the aforementioned void toward the orifice 22. The ink which filled the void will in part add to the reformed ink meniscus substantially at the orifice 22 to effect an increased thickness thereof.

The support member 15 maintains the pin at a precise distance from the recording surface 17 so that pin 12 never quite makes contact with the recording surface. This has been found essential since if the pin touches the recording surface it produces two defects in the recorded image. The first is due to the rapid motion of the pin which forces the ink out to the sides before it can be absorbed into the paper, producing a splattering action. The second is the tendency of the pin to drag the ink droplet due to the lateral motion between the recording pin and the recording surface. With regard to this latter point, it can be understood that, when the pin does not come into actual contact with the paper, the ink carried laterally by the pin is pulled back to the spot of deposition by surface tension when it breaks from the point of the pin.

The materials with which the recording pin is made are not highly critical. The reservoir and capillary tube may be made of metal, glass, plastic, or other conventional material and the pin may be stainless steel or other corrosion-resistant metal selected for its structural strength. The capillary tube and the coaxial pin should both be wettable by whatever ink is used. However, this is conventional and where the materials do not have the desired wettability, surface treatments as well-known in the art can produce the wettability. Outside of the specialized features of the stylus and the manner of operation, a similar type of recording device is disclosed in U.S. Patent No. 2,951,894.

Most commercial pen inks are compatible with the present pen. For example, "Strip" Washable #64 Black and "Skrip" Permanent #34 Jet Black available from the W. A. Sheaffer Pen Company, as well as numerous colored inks have proved suitable. It is one of the advantages of the present pen that it is self-cleaning and any ink dried at the tip of the pen is quickly cleared away by operation of the pen even after being unused for a few days.

In order for the pen to operate in a preferred manner described, a number of factors should be observed in the construction of the pen. For the embodiment in which the pin has a circular cross section, the diameter of the pin 12 at the tip is determined by the desired dot size to be obtained in recording. A preferred diameter for good quality facsimile resolution is in the range of 0.005 inch to 0.010 inch. With low speed and high resolution requirements, the pin diameter can be reduced giving a smaller dot size. However, as speed requirements increase the pin size must also be increased, so as to get an adequate recording density on the recording medium. (Note that "speed" as used above refers to document speed as distinct from pin operating speed.) As the pin diameter and therefore, the dot size is increased over 0.010 inch the degradation in resolution becomes noticeable. The bore size of the capillary tube is dependent on the desired pin diameter. Thus, for the ink composition named, the pin diameter may be about 70 to 95% of the bore diameter. The exact relation within or without this range is determined by the ink flow requirements of an ink selected. If the pin diameter is less than 70% of the bore diameter, most available inks tend to produce uncontrolled deposition on the recording sheet, while if the pin diameter is more than 95% of the bore diameter, there is inadequate ink flow resulting in weak and sometimes no deposition of ink on the receiving sheet.

Foot 16 and support member 15 maintain a uniform spacing between orifice 22 and the recording surface 17 which may be in a preferred range of about 0.003 inch to 0.020 inch. Since this spacing determines the amount of excursion from the orifice to the recording surface 17 required for pin 12, it has been found desirable to keep it as small as possible, so as to reduce the driving requirements for pin 12. The minimum spacing is determined partly by the roughness or capillary action of the recording paper and partly by the size of the meniscus of ink formed at the orifice. Spacing should be sufficient to prevent any possibility of contact between the recording surface and the ink meniscus, since this would cause unwanted and uncontrolled deposition of ink.

Pin 12 is supported by the transducer assembly in a position so that when the transducer is unenergized, the tip of the pin is approximately at the plane of orifice 22. The amplitude of the signal to transducer 13 is then adjusted so that the record peak of the pin stroke is approximately adjacent to the recording surface. This permits the ink on the pin tip to touch the recording surface while contact between the pin itself and the recording surface is avoided. The exact tolerance for this will vary under conditions of operation but can easily be obtained emperically by observing the recording made by the pen while adjusting the amplitude of the signal via amplitude control 29 into transducer 13. If the pin tip approaches too close to the paper surface, the deposited ink dots become enlarged and irregular while if the pin tip is too far removed from the recording surface there is a tendency to skip or to inadequately deposit the ink dots. By way of example, with the orifice 22 spaced about 0.0045 inch from the recording surface, pin 12 must move through a total stroke having a peak-to-peak distance of approximately 0.008 inch. Since the pin operates in a reciprocating manner, this permits it to move 0.004 inch from the orifice plane to a plane near the recording surface, and to reverse to a distance into the bore of tube 11 approximately 0.004 inch behind the orifice plane. Under these operating conditions, with an orifice-to-recording surface distance of 0.0045 inch, the film thickness of the portion 14 of the ink meniscus on the tip of the pin is approximately 0.0005 inch.

The table below lists dimensional data for operation of the recording pen with preferred materials at two peak-to-peak stroke distances and is presented as an example of suitable dimensions and is in no way limiting.

TABLE

| | | |
|---|---|---|
| Stroke (peak-to-peak) | 0.005 in | 0.023 in. |
| Orifice-to-recording surface distance | 0.003 in | 0.012 in. |
| Diameter pin ($D_p$) | 0.008 in | app. 0.0095 in. |
| Diameter bore ($D_b$) | 0.010 in | 0.010 in. |
| Ratio $D_p$ to $D_b$ | 0.8 in | 0.95 in. |

No absolute limitations have been found on the speed of the operation of the recording pen in accordance with the invention. However, those skilled in the art will understand that, under the operating conditions just described, inertia considerations make the problem of drive requirements rather acute when the speed exceeds about 10,000 cycles per second. While not to be limiting, the present preferred speed range for practical application is about 5,000 to 6,000 cycles per second. This speed, for example, enables recording at a somewhat higher rate than used in most current commercial facsimile applications, without introducing stringent requirements on the driving mechanism. Pin 12 can be driven by any one of a number of electrically actuated driving means. These include such things as piezoelectric, magnetostrictive and electromagnetic devices.

FIGURE 6 is a block diagram showing the pen in accordance with the present invention incorporated in a facsimile receiving system for producing the control signal for transducer 13. Signals coming from a facsimile receiver 25 are illustrated by waveform 26. By way of example, these signals can initially be obtained by scanning a document with a light beam and sensing the variations in reflectance with a photocell. When the photocell passes over white areas of a document, it generates an electric current of one amplitude and when passing over characters or other dark areas on the oiginal, it generates an electric current of a different amplitude. These changes in current amplitude, occurring as the photocell scans printed characters, appear as pulses having widths representing the width of the characters scanned by the photocell. The information represented by the pulses is conventionally added to a carrier wave for transmission by wire or electromagnetic radiation to a facsimile receiver such as receiver 25 in FIGURE 6. The facsimile receiver amplifies and detects the information from the carrier wave so it appears again in a pulse configuration similar to that coming directly from the photocell. Assuming that the positively going pulses represent points on the original document where the photocell sensed dark areas, the first positive pulse illustrated in waveform 26 represents a dark area of one width while the second positive pulse represents a dark area of a lesser width. The pulses coming from facsimile receiver 25 turn an oscillator 27 on and off. While waveform 28 from oscillator 27 is illustrated as generally sinusoidal, oscillator 27 is suitably a multivibrator. Due to inertia, the motion of pin 12 will be sinusoidal with either a sine wave or square wave input to transducer 13. With waveform 26 at its positive level, the oscillator is "on" and with waveform 26 at its negative level the oscillator is "off." The oscillator frequency is fixed as that of the desired operation rate of the recording pen, preferably in the range of 5,000 to 6,000 cycles per second, as stated above. The number of cycles representing a given width of dark line such as the width of the line in a typed character will depend upon the scan rate and may be in the vicinity of two to five cycles for the thickness of a character line. However, as illustrated here for simplicity, symmetrical waveform 28 shows two cycles of oscillation for the first and wider of the two pulses in waveform 26 and one cycle for the second and narrower of the two pulses.

There are two ways in which an oscillator is turned on and off by an electrical signal. In the first and preferable way for the purpose, the electrical signal actually starts the oscillator oscillating with each "on" pulse and stops the oscillator with each "off" pulse. The second way the oscillator remains running at all times and the electrical signal merely operates to open and close the path of the next stage of the circuit. The first method which actually starts and stops the oscillator with each pulse is preferable since it enables higher resolution recording in accordance with this invention. Starting the oscillator from rest with each "on" signal insures that the oscillator waveforms begin at reference potential and swing in the same direction at the beginning of each "on" pulse. With a continuously running oscillator, an "on" pulse might appear in the middle of the down swing in the oscillator waveform which would cause the pin in the pen of the present invention to swing in the opposite direction, thus displacing the first dot that would appear after the signal and in some cases changing the total number of dots that would appear from each "on" pulse.

Following oscillator 27, a limiter amplifier 30 insures that the waveform as it arrives at the transducer is uniform in height. Waveform 33 illustrates generally the output from the limiter amplifier 30. Limiter amplifier 30 has an amplitude control 29 to enable varying the amplitude of the waveform height so that the stroke peak-to-peak distance of pin 12 in the recording pen can be varied slightly depending upon the type of ink and the type of paper used. In this way, the pin can be adjusted to reach a desirable proximity to the recording surface without touching this surface. Limiter amplifier 30 provides the driving power required to operate electromechanical transducer 13. Transducer 13 changes the electrical signal from the limiter amplifier into reciprocating mechanical motion for operating pin 12 in recording pen 31.

Generally, and to a limited extent, the contrast produced by the recording pen on a recording surface is determined by the amount of ink delivered in each droplet to the recording surface 17. That is, to a limited degree the amount of ink delivered in each droplet to the recording surface will, for example, in the case of paper or similar recording materials, be at least partially absorbed by the recording material, where the amount of ink is small as to be totally absorbed, the inked area can appear diffused to the observer such as gray rather than the intended black. Accordingly, by increasing the quantity of the delivered ink it can be made to retain its composite color, and for example with black ink, to appear black upon observation after the absorption is completed.

As was noted above, the amount of ink delivered by the pin tip is determined by the ink thickness comprising the meniscus at the orifice of the capillary tube. This ink flow, in turn, for effecting this thickness is dependent on two parameters, namely, the bore peak of the pin's stroke and the bore gap surrounding the pin periphery within the capillary tube. As a practical consideration, the latter parameter is invariable once the recording pen has been constructed. Therefore, in order to achieve some control of contrast, the bore peak of the pin's stroke in accordance with the invention hereof is made selectively variable.

As the pin recedes into the capillary tube, the ink on the peripheral surface of the pin along with the amount of ink flowing in the tube reforms the meniscus substantially at the orifice 22. As the pin arrives at the bore peak of the stroke and reverses for the movement toward the recording surface, it urges an additional amount of ink toward the orifice which will augment the quantity of ink already present there in the form of the reformed meniscus thereby increasing the film thickness of that portion 14 of the meniscus carried by the tip of the pin to the recording surface. From this point, it can be readily understood that with fixed capillary tube and pin dimensions, the degree of contrast to a limited extent is proportional to the distance the tip of the pin 12 recedes above the orifice plane into the capillary tube 11, i.e., the bore peak of the stroke. This variation in the bore peak of the stroke could be achieved through adjustment of the amplitude control 29 which varies the amplitude of the signal at the output of the limiter amplifier 30. However, such a method of contrast control is undesirable because of the fact that the orifice-to-recording surface distance would have to be adjusted accordingly for each contrast variation in order to prevent the pin from contacting the recording surface.

In order therefore to compensate for desired contrast without affecting the other adjustment, a bi-polar attenuator 32 may be utilized to selectively adjust the amplitude of one or both polarity pulses at the output from limiter amplifier 30 thereby providing an asymmetrical signal. This attenuator is of conventional design of a type, for example, including two oppositely poled diodes in two parallel circuit branches. The branches also contain two potentiometers, respectively, at the output side of the diodes so that the tap on each potentiometer may be moved to vary the amplitude of the particular pulse passed by each diode. In this manner, the amplitude of the pulses in waveform 33 may be asymmetrically varied so that the contrast may be controlled without a corresponding adjustment of the orifice-to-recording surface distance.

FIGURE 7 illustrates a recording apparatus suitable for utilizing the recording pen of the present invention. In FIGURE 7, drum 35 is supported on base 36 by support members 37 and driven by reversible motor 38 operating through drive belt 40 connecting the motor to shaft 41 of drum 35. Sheet of paper 42 wrapped around drum 35 serves as a recording surface. Pen 31 in accordance with the invention is supported adjacent to the surface of the drum and transported across the surface of the drum by screw means 43. Screw means 43 is rotated by spur gear 45 connected to the shaft of drum 35 coacting with spur gear 46 attached to the shaft of screw means 43. The gearing ratio is such that, as pen 31 moves one dot line width across the surface of drum 35, drum 35 makes a complete rotation.

Pen 31 as illustrated in FIGURE 7 is essentially similar to that illustrated in FIGURE 1. However, pen 31 as illustrated in FIGURE 7 includes ink filler spout 47 with cap 48 which may be a vent type cap preventing any vacuum from occurring in the ink container.

One suitable form of a transducer is illustrated as electromagnetic transducer 13. In this transducer, reciprocating pin 12 is supported by elastic spiders 51 and 52 suitably thin spring metal arrangements permitting the necessary stroke movement of pin 12. Rigidly fixed to pin 12 is a wire wound coil 53 with terminals 55 for connection to the signal source 21. In the case of a recording system of the form illustrated in the block diagram of FIGURE 6, the connection to terminals 55 would be limiter amplifier 30 as modulated by attenuator 32. Elements 56 and 57 of transducer 13 are magnetic pole pieces which interact with wire wound coil 53 to produce the desired reciprocating movement of pin 12 in accordance with the oscillatory signals received at terminal 55.

While described in the specific embodiment of FIGURE 7, for facsimile use, the recording pen of the present invention is adaptable for use in a wide variety of applications. It is therefore not intended to be confined to the details set forth since it is apparent that certain modifications may be made without departing from the scope of the invention. For example, pin 12 or its tip may have any suitable cross-sectional configuration such as circular, square, elliptical, or character shaped. It is to be understood that the bore of the capillary tube 11 must have a configuration and size operably compatible with that of the pin 12.

Also, although the recording pen has been illustrated in a relative vertical position with respect to a recording surface, it should be understood that with an effective capillary action gravity is a factor of such insignificance that the recording pen will operate satisfactorily in a position such that the stroke of the pin is horizontally oriented relative to a vertical recording surface. In this horizontal position, it is noted that the ink reservoir would be suitably constructed to prevent spillage and the ink therein should be maintained at such a level as to continuously make available to the capillary tube 11 all the ink it requires for proper operation of the pen.

Since many changes could be made in the above construction and many apparently widely different embodiments of this invention could be made without departing from the scope thereof, it is intended that all matter contained in the drawings and specification shall be interpreted as illustrative and not in a limiting sense.

What is claimed is:

1. An ink recording apparatus responsive to electrical signals for recording intelligence in the form of ink dots comprising:
   (a) support means for supporting a record receiving member on which ink dots are to be placed;
   (b) a reservoir containing liquid ink;
   (c) a hollow capillary connected to said reservoir to receive ink therefrom and terminating as an orifice opposite the record receiving member on said support means;
   (d) means for maintaining the orifice plane of said capillary at a substantially uniform predetermined spacing relative to the surface of a record receiving member on said support means;
   (e) an elongated rod having two ends and extending substantially coaxially within said hollow capillary;
   (f) an electromechanical transducer means coupled to one end of said rod and responsive to a received electrical signal of intelligence to move said rod from a position at which the other end of said rod is in said capillary behind said orifice plane to a record position closely adjacent and spaced from the record receiving member to place ink carried on said other end from the vicinity of said orifice onto the record receiving member, said record position and said orifice plane being separated by a distance less than said uniform predetermined spacing; and,
   (g) means to provide relative motion between the surface of a record receiving member on said support means and said orifice.

2. An ink recording apparatus according to claim 1 wherein:
   (a) said rod and the internal bore of said hollow capillary are substantially cylindrical; and,
   (b) the cross-sectional diameter of said rod is in the range of 70 to 95 percent of the cross-sectional diameter of said bore.

3. An ink recording pen responsive to electrical signals comprising in combination:
   (a) a reservoir containing liquid ink;
   (b) a capillary tube connected to said reservoir to receive ink therefrom and terminating as an orifice;
   (c) a cylindrical pin in the range of 0.005 to 0.010 inch in diameter, which is 70 to 95 percent of the bore diameter of said tube, said pin having two ends and internally positioned substantially coaxially within said tube for transporting ink from the vicinity of said orifice to an adjacent recording surface;
   (d) foot means operable for maintaining a substantially uniform predetermined distance between said orifice and an adjacent recording surface; and, (e) an electromechanical transducer means operably connected to one end of said pin and responsive to a received electrical signal of intelligence to move said pin from a position at which the other end of said pin is in said capillary tube behind said orifice plane to a record position closely adjacent and spaced from a recording surface to place ink carried on said other end from the vicinity of said orifice onto a recording surface, said record position and said orifice plane being separated by distance less than said uniform predetermined distance.

4. An ink recording apparatus responsive to electrical signals for recording intelligence in the form of ink dots comprising:
(a) a source of electrical signals indicative of intelligence to be recorded on a record receiving member on said support means;
(b) oscillator means coupled to said source and responsive to said electrical signals for generating symmetrical electrical oscillators;
(c) support means for supporting a record receiving member on which ink dots are to be placed;
(d) a reservoir containing liquid ink;
(e) a hollow capillary connected to said reservoir to receive ink therefrom and terminating as an orifice opposite the record receiving member on said support means;
(f) means for maintaining the orifice plane of said capillary at a substantially uniform predetermined spacing relative to the surface of a record receiving member on said support means;
(g) an elongated rod having two ends and extending substantially coaxially within said hollow capillary;
(h) an electromechanical transducer coupled to one end of said rod and responsive to energizing signals of intelligence to move said rod from a position at which the other end of said rod is in said capillary behind said orifice plane to a position closely adjacent the record receiving member to place ink carried on said other end from the vicinity of said orifice onto the record receiving member;
(i) translating means for coupling energizing signals proportional to said oscillations to said transducer means;
(j) means to modify said energizing signals to control the motion of said rod to prevent contact between said rod and said record receiving member; and,
(k) means to provide relative motion between the surface of a record receiving member on said support means and said orifice.

5. An ink recording apparatus according to claim 4 wherein said translating means includes an attenuator means for selectively attenuating said symmetrical oscillations to produce asymmetrical oscillations.

6. An ink recording apparatus comprising:
(a) a source of electrical signals indicative of information to be recorded as ink dots on a recording medium;
(b) means for supporting a recording medium;
(c) ink containing means having an orifice across which an ink meniscus is formed;
(d) spacer means for maintaining a substantially uniform predetermined distance between said orifice and a recording medium on said support means;
(e) carrier means responsive to said electrical signals for carrying a central portion of said ink meniscus beyond said orifice and delivering said central portion to a recording medium on said support means;
(f) means to provide relative motion between said recording medium and said orifice; and,
(g) contrast control means intercoupled between said source of electrical signals and said carrier means for selectively varying the amount of ink constituting said ink meniscus.

References Cited
UNITED STATES PATENTS

| | | | |
|---|---|---|---|
| 587,336 | 8/1897 | Short | 178—96 |
| 1,360,823 | 11/1920 | Thwing | 346—140 XR |
| 3,146,058 | 8/1964 | Henshaw | 346—140 |

RICHARD B. WILKINSON, *Primary Examiner.*

J. W. HARTARY, *Assistant Examiner.*